US007182246B1

(12) United States Patent
Sievel

(10) Patent No.: US 7,182,246 B1
(45) Date of Patent: Feb. 27, 2007

(54) SECURE COLLECTION BOX FOR MAIL PIECES

(75) Inventor: Mark E. Sievel, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/431,327

(22) Filed: May 10, 2006

(51) Int. Cl.
*B65G 11/04* (2006.01)

(52) U.S. Cl. .......................................... 232/45; 232/47

(58) Field of Classification Search .................. 232/45, 232/44, 47, 43.1; D99/29–32; 220/211, 220/345.1, 350; 312/297
See application file for complete search history.

(56) References Cited

U.S. PATENT DOCUMENTS

| | | | | |
|---|---|---|---|---|
| 2,739,730 | A * | 3/1956 | Jonas | 220/350 |
| 3,044,841 | A * | 7/1962 | Hein | 312/139.1 |
| D242,595 | S * | 12/1976 | De Lise et al. | D34/8 |
| 4,162,024 | A * | 7/1979 | Shanley | 220/350 |
| 5,233,532 | A | 8/1993 | Ramsden | |
| 5,340,948 | A | 8/1994 | Ramsden | |
| 5,481,464 | A | 1/1996 | Ramsden | |
| 5,494,181 | A * | 2/1996 | Denney | 217/62 |
| 5,656,799 | A | 8/1997 | Ramsden et al. | |
| 5,975,329 | A * | 11/1999 | Schmitt | 220/350 |
| 6,247,642 | B1 * | 6/2001 | Wilson, Jr. | 232/47 |
| 6,318,579 | B1 * | 11/2001 | Leess | 220/345.2 |
| 6,347,737 | B1 | 2/2002 | Madruga | |
| 6,752,476 | B2 * | 6/2004 | Lin | 312/290 |
| 6,859,005 | B2 * | 2/2005 | Boliver | 318/480 |
| 6,959,858 | B2 * | 11/2005 | Stagnaro | 232/19 |
| 6,976,620 | B2 | 12/2005 | Swider | |

* cited by examiner

*Primary Examiner*—William L. Miller
(74) *Attorney, Agent, or Firm*—Brian A. Lemm; Angelo N. Chaclas

(57) ABSTRACT

A drop box for storing mail pieces includes an enclosure, and an articulated door which runs on tracks. The door is selectively positioned in a horizontal course. When the door is in the horizontal course, a mail piece may be inserted through an opening in the enclosure and placed on the door. The door is then withdrawn from the horizontal course to allow the mail piece to drop into a lower portion of the enclosure. When the door has been withdrawn from the horizontal course, it closes the opening in the enclosure.

6 Claims, 4 Drawing Sheets

SECURE COLLECTION BOX FOR MAIL PIECES

BACKGROUND

This invention relates to a box for the secure deposit of articles.

Many types of deposit or drop boxes for letters, packages and the like (hereinafter, referred to collectively as "mail pieces"), are in use. Some kinds, such as the familiar U.S. Postal Service letter collection boxes, include a simple hinged door. Other types of deposit boxes and containers have been proposed that include a complex combination of two or more doors. Exemplary of the latter type of deposit container are those shown in U.S. Pat. No. 5,340,948 to Ramsden and related patents issued to the same inventor. Nevertheless, a need remains for a simple, secure drop box that is suitable for receiving parcels of some size in addition to letters.

SUMMARY

A mail piece drop box includes an enclosure, a first door-guiding track at a first interior side of the enclosure, and a second door-guiding track at a second interior side of the enclosure. The second interior side of the enclosure is opposite to the first interior side of the enclosure. The drop box also includes an articulated door positioned to run in the tracks along a path defined by the tracks. The door is composed of a first elongate segment and a sequence of additional parallel elongate segments each hingedly joined to a respective preceding one of the segments. The path defined by the tracks includes a substantially horizontal course and a substantially vertical course. The door is movable along the tracks between the horizontal course and the vertical course. The door defines at least a portion of a floor of an upper portion of the enclosure when the door is in the horizontal course. The door closes a vertical opening (mail piece insertion aperture) of the enclosure when the door is in the vertical course. The door is positioned, when in the horizontal course, to receive a mail piece inserted through the opening. The door is operative to drop the mail piece from the upper portion of the enclosure to a lower portion of the enclosure upon the door being moved from the horizontal course to the vertical course.

A bias mechanism may be provided to bias the door toward either the vertical course or the horizontal course. In addition or alternatively, a motor may be provided to move the door between the vertical course and the horizontal course.

In another aspect, a mail piece drop box includes an enclosure, a first door-guiding track at a first interior side of the enclosure, and a second door-guiding track at a second interior side of the enclosure. The second interior side of the enclosure is opposite to the first interior side of the enclosure. The drop box also includes an articulated door positioned to run in the tracks along a path defined by the tracks. The door is composed of a first elongate segment and a sequence of additional parallel elongate segments each hingedly joined to a respective preceding one of the segments. The path defined by the tracks includes a front vertical course, a top horizontal course, a rear vertical course spaced behind the front vertical course, and a bottom horizontal course spaced below the top horizontal course. The door is movable along the tracks between a first position and a second position. The door occupies the bottom horizontal course, the rear vertical course and the top horizontal course when the door is in the first position. The door occupies the front vertical course, the top horizontal course and the rear vertical course when the door is in the second position. The door is positioned to define at least a portion of a floor of an upper portion of the enclosure when the door is in the first position. The door is positioned to receive, at the bottom horizontal course, a mail piece inserted into the upper portion of the enclosure via an opening in the enclosure when the door is in the first position. The door is operative to drop the mail piece from the upper portion of the enclosure to a lower portion of the enclosure upon the door being moved from the first position to the second position. The door closes the opening in the enclosure when the door is in the second position.

A bias mechanism may be provided to bias the door from the second position toward the first position or from the first position toward the second position. In addition or alternatively, a motor may be coupled to the door to move the door between the first and second positions.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention, in its various aspects, uses an articulated door, akin to an overhead garage door or the retractable cover of a roll top desk, to close the mail piece insertion aperture of a mail piece drop box. The door of the drop box runs in tracks that are located on either side of the interior of the drop box. In one position, the door closes the mail piece insertion aperture. In another position, the door of the drop box leaves the mail piece insertion aperture open and provides a retractable shelf on which a mail piece may be placed in one step of depositing the mail piece in the drop box.

Figure 1:
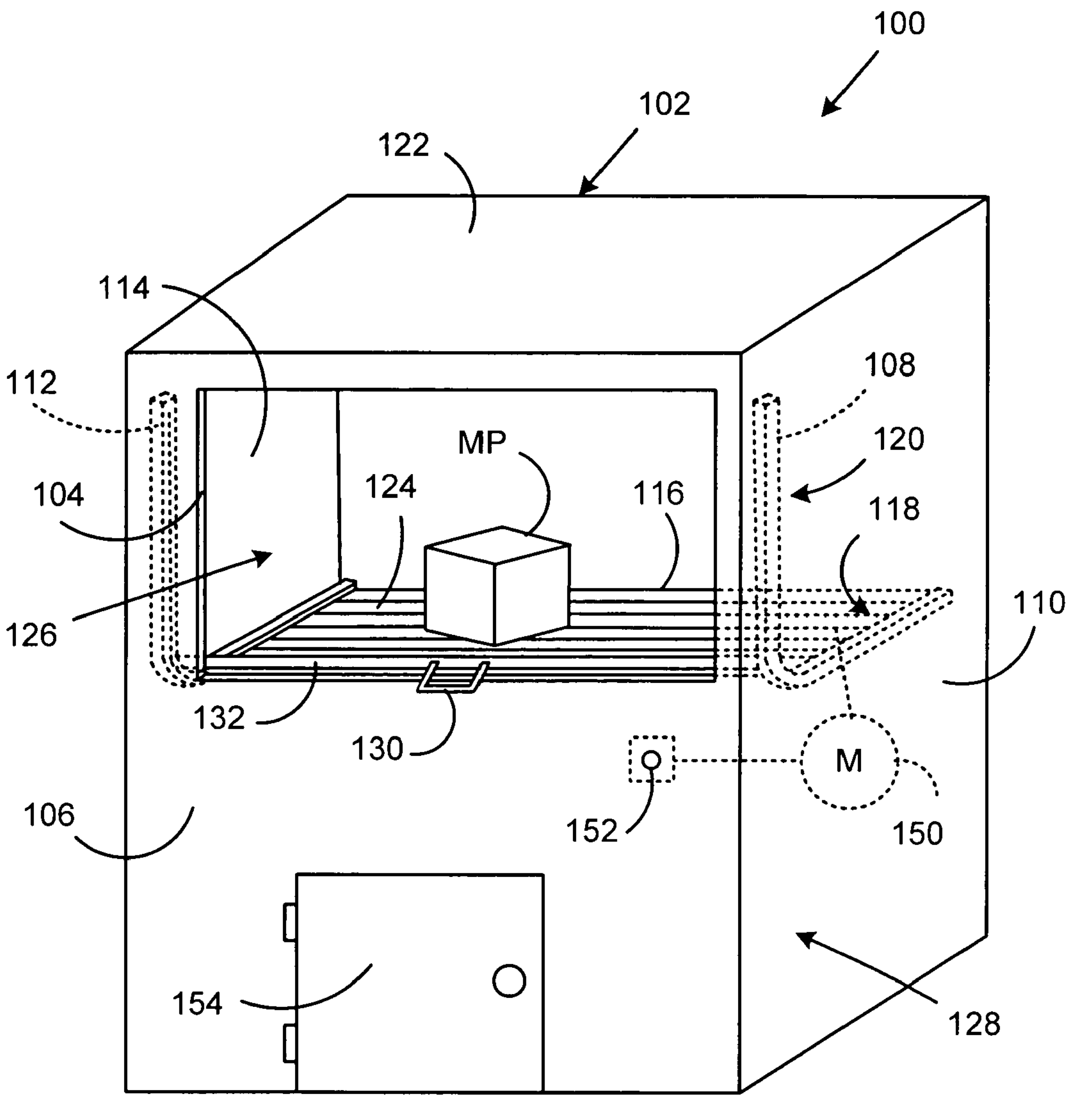
FIG. 1 is a schematic isometric view of a mail piece drop box according to some embodiments.

FIG. 1 is a schematic isometric view of a mail piece drop box 100 according to some embodiments. The drop box 100 includes an enclosure 102. The enclosure 102 may be a box formed of metal plates or another suitable material and includes an opening 104 at an upper location on the front wall 106 of the enclosure 102. The opening 104 may serve as a mail piece insertion aperture for the enclosure 102, and preferably has maximum dimensions such that the size of a mail piece that can be passed therethrough is limited to comply with carrier regulations regarding the maximum size of a mail piece that can be shipped.

The drop box 100 has a right-side door-guiding track 108 formed on the interior of the right side wall 110 of the enclosure 102, and a left-side door-guiding track 112 formed on the interior of the left side wall 114 of the enclosure 102. The tracks 108, 112 are provided for the purpose of guiding the articulated door 116 of the drop box 100. The tracks 108, 112 define a path of movement for the door 116. The path includes a horizontal course 118 and a vertical course 120. It will be noted that the opening 104 is above the horizontal course 118 and below the top wall 122 of the enclosure 102 so that the opening 104 is between the horizontal course 118 and the top wall 122, though offset laterally relative to the horizontal course 118 and the top wall 122. It also should be noted that the horizontal course 118 and the vertical course 120 are configured to require at least a portion of the door 116 to be raised to move the door 116 from the horizontal course 118 to the vertical course 120.

The door 116 is formed from a considerable number of elongate segments 124, arrayed in sequence and (except for a first one of the segments) hingedly joined to a preceding segment in the sequence. The door segments may be formed of metal or another suitable material. Metal may be preferred so as to provide considerable resistance to tampering. When the door 116 occupies the horizontal course 118, as shown in FIG. 1, the door 116 defines a floor for an upper portion 126 of the enclosure 102, and thus substantially separates the upper portion 126 of the enclosure 102 from a lower portion 128 of the enclosure. The vertical course 120 is adjacent the opening 104 so that when the door 116 occupies the vertical course 120 (this position of the door not shown in the drawings), the door serves to close the opening 104. A handle 130 may be provided at the center of a leading edge 132 of the door 116. The handle 130 may be grasped by a user and used to move the door 116 between the horizontal course 118 and the vertical course 120.

Figure 2:
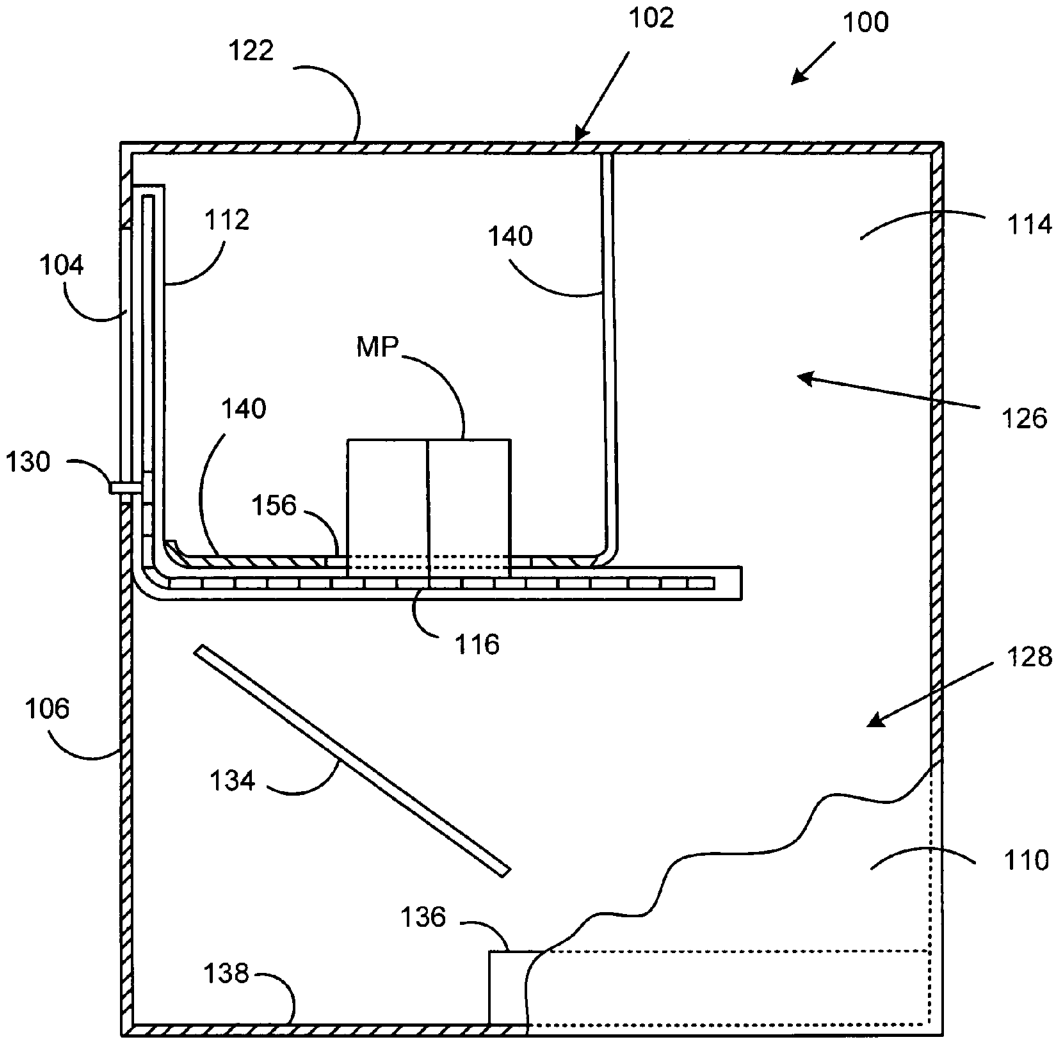
FIG. 2 is a schematic side view of the drop box of FIG. 1.

FIG. 2 is a schematic side view of the drop box 100. In the view shown in FIG. 2, the door 116 is positioned to occupy the horizontal course of its path, and thus is positioned to separate the upper portion 126 of the enclosure 102 from the lower portion 128 of the enclosure 102. Optionally, an interior back wall/floor assembly 140 can be provided (not shown in FIG. 1). The assembly 140 can be attached to the side walls 110, 114 and includes an opening 156 in the floor portion of the assembly 140 which is occupied by the door 116 when positioned in the horizontal course of its path. The size of the opening 156 can be used to limit the size of a mail piece that can be deposited into the drop box 100. A mail piece (reference MP) can be placed into the opening 156 such that it rests on the door 116. The drop box 100 may include a ramp 134 positioned below the horizontal course of the path of the door 116 in the area of the opening 156. The ramp 134 may be inclined downwardly away from the front wall 106 of the enclosure 102. The ramp 134 thus may serve to guide a mail piece downwardly and away from the opening 104 after the mail piece MP is dropped from the door 116. The ramp may also help to prevent would-be thieves from reaching down into the lower portion 128 of the enclosure 102 to remove mail pieces already deposited into the drop box 100. One or more additional ramps or guides (not shown) may also be provided to guide the mail piece MP back toward the front of the enclosure 102. A resilient pad 136 or the like may be provided on the floor 138 of the enclosure 102 to cushion the fall of the mail piece MP.

Figure 3:
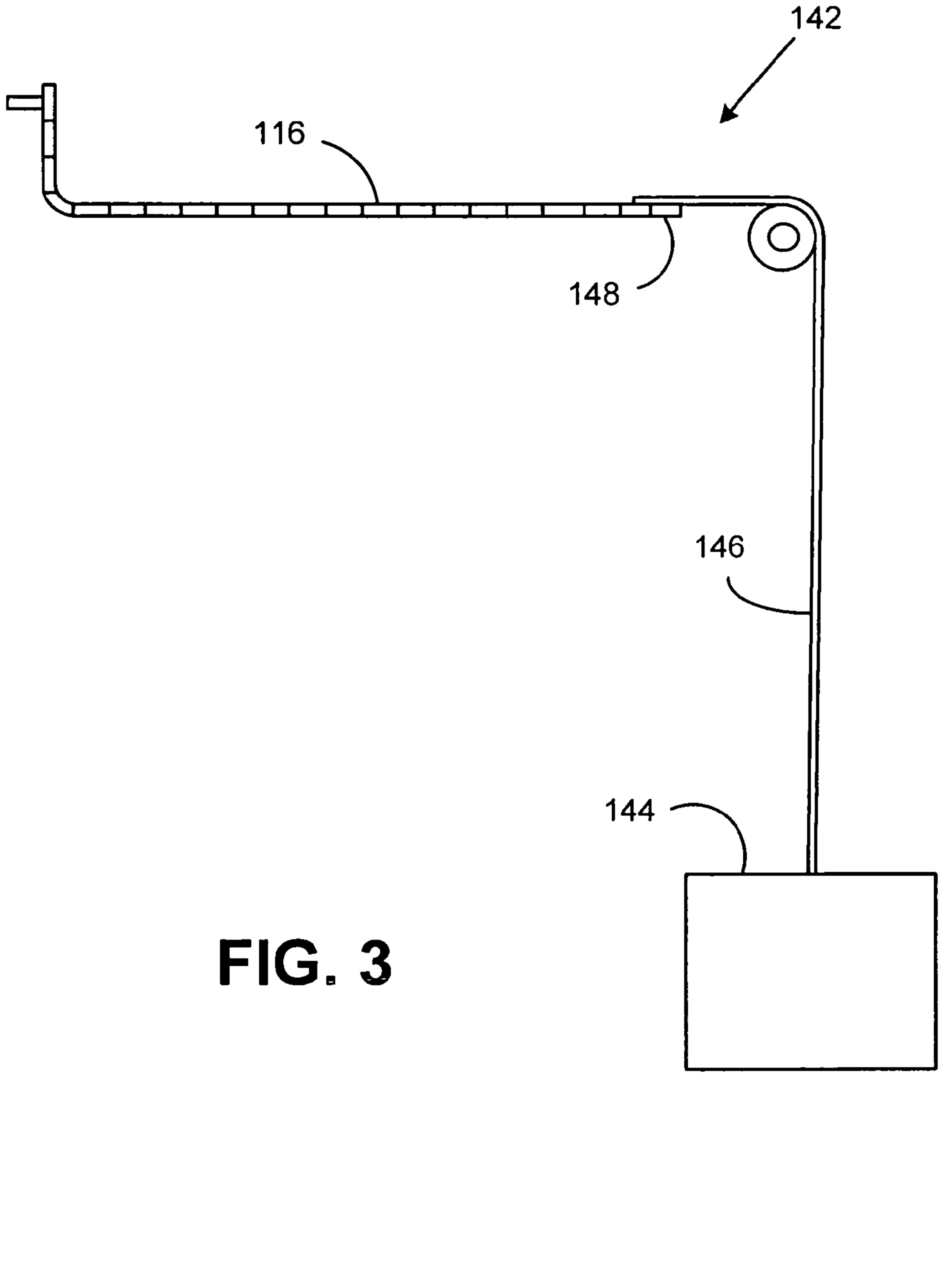
FIG. 3 is a schematic illustration of a door-bias arrangement that may be included in the drop box of FIGS. 1 and 3.

FIG. 3 is a schematic illustration of a door-bias arrangement 142 that may be included in the drop box in some embodiments thereof. The door bias arrangement may include one or more weights 144 (only one shown) coupled by one or more cords or chains 146 (only one shown) to the trailing edge 148 of the door 116 to bias the door 116 from the vertical course to the horizontal course of the door's path.

In some embodiments, one or more springs or other bias devices may be used instead of or in addition to the bias arrangement shown in FIG. 3. In other embodiments, the bias arrangement or other bias device may bias the door toward the vertical course rather than toward the horizontal course. Biasing toward the vertical course may be preferable in some situations so that the opening 104 (FIGS. 1 and 2) is normally closed to keep out rain, etc., from the enclosure 102. In still other embodiments, a motor (shown in phantom and indicated by reference numeral 150 in FIG. 1) may be included in the drop box 100 and coupled to the door 116 through any conventional means, e.g., chain drive, belt drive, etc., so that the door 116 is moved by the motor 150 instead of by bias device or manual handling by the user. The motor may be controlled in response to a push button or buttons (only one shown) 152 located on the front wall 106 of the enclosure 102. If the door 116 is motorized, it may be desirable to provide safety sensors (not shown) and/or interlocks (not shown) to prevent the door 116 from closing on the user's hand. A locked door 154, which may be provided in the front wall 106 as illustrated or the rear or side walls of the enclosure 102, is preferably provided to permit authorized personnel to remove mail pieces that have been deposited into the lower portion 128 of the drop box 100 as described below.

In operation, the user (not shown) approaches the front wall 106 of the enclosure 102 and places the mail piece MP through the opening 104 of the enclosure 102 and onto the door 116 which is occupying the horizontal course 118 of its path through the opening 156 in assembly 140 (if provided). The assembly 140 and the position of the door 116 closing the opening 156 prevents access to the lower portion 128 of the drop box 100, thereby securely maintaining any mail pieces that have already been deposited therein. The mail piece MP is thus supported on the door 116 in the upper portion 126 of the enclosure 102. The user then causes the door 116 to move from the horizontal course 118 to the vertical course 120 by, e.g., grasping and lifting the handle 130. As the door 116 moves from the horizontal course 118 to the vertical course 120, the door is withdrawn from under the mail piece MP, allowing the mail piece MP to drop through the opening 156 to the ramp 134 (FIG. 2) and be guided by the ramp 134 to the pad 136 on the floor 138 of the enclosure 102. Because of the positioning of the door 116 as it is moved from the horizontal course 118 to the vertical course 120, access to the lower portion 128 of the drop box 100 is still sufficiently limited to prevent removal of any mail pieces already stored in the lower portion 128. Once the door fully or mainly occupies the vertical course 120 (FIG. 1), the user may release the handle 130 to allow the door 116 to be moved back to the horizontal course 118. Once the door 116 again completely occupies the horizontal course 118, the drop box 100 is ready to receive another mail piece.

Regardless of the position of the door 116 with respect to the horizontal course 118 and the vertical course 120, access by unauthorized persons to the lower portion 128 of the drop box 100 is limited by the geometry and shape of the drop box 100 such that a potential thief would not be able to reach into the drop box 100 to remove any mail pieces stored therein. Thus, the drop box shown in FIGS. 1–3, with an articulated door, provides a satisfactory amount of security for mail pieces deposited therein, but with a relatively simple and low-cost design.

Figure 4:
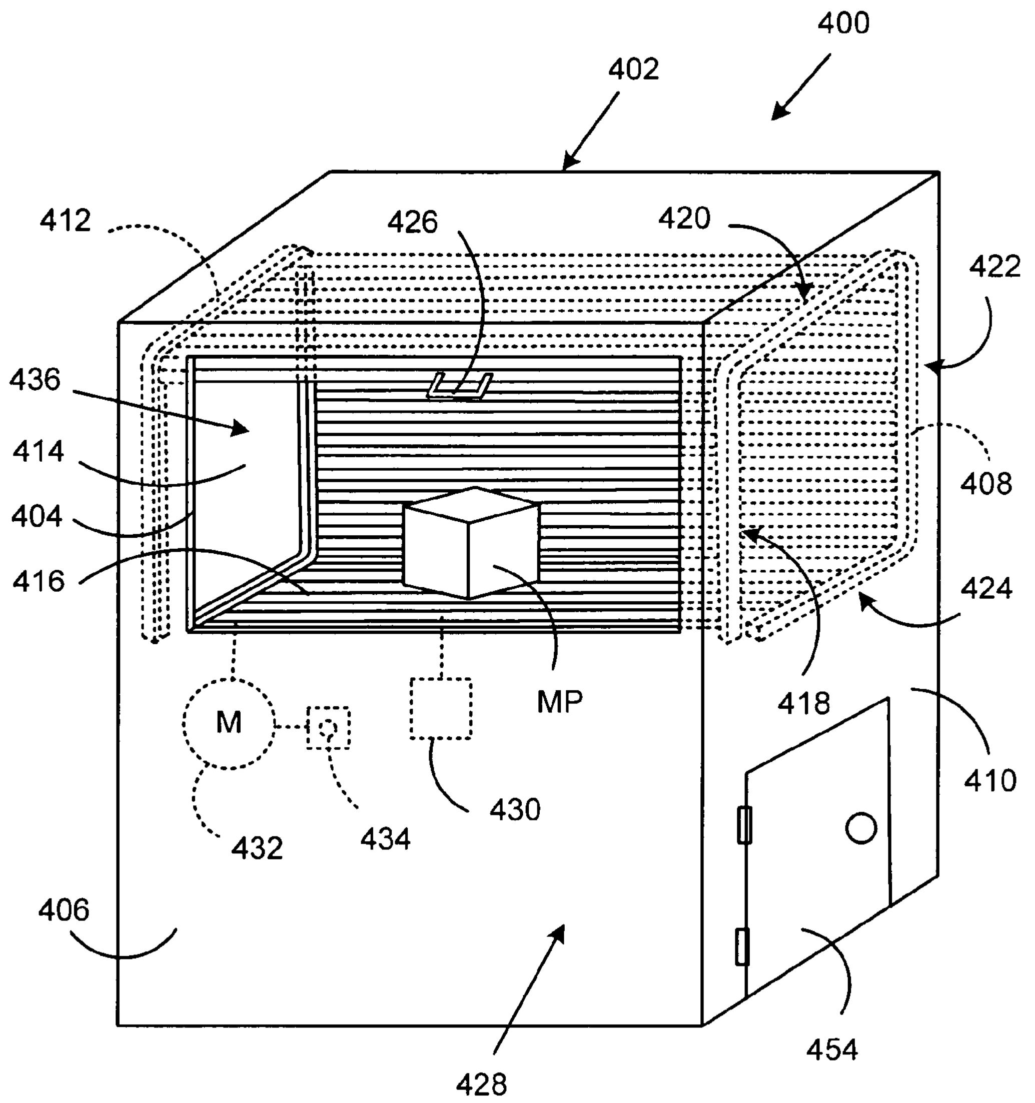
FIG. 4 is a schematic isometric view of a mail piece drop box according to some other embodiments.

FIG. 4 is a schematic isometric view of a mail piece drop box 400 according to some other embodiments. The drop box 400 includes an enclosure 402. The enclosure 402 may be similar to the enclosure 102 described above, including an opening 404 at an upper location on the front wall 406 of the enclosure 402 and a locked door 454. The opening 404 may serve as a mail piece insertion aperture for the enclosure 402, while the locked door 454 can be used by authorized personnel to remove mail pieces stored in the drop box 400.

The drop box 400 includes a right-side door-guiding track 408 formed on the interior of the right side wall 410 of the enclosure 402, and a left-side door-guiding track 412 formed on the interior of the left side wall 414 of the enclosure 402. As in the embodiment of FIG. 1, the tracks 408, 412 are provided for the purpose of guiding the articulated door 416 included in the drop box 400. The tracks 408, 412 define a path of movement for the door 416, including a front vertical course 418, a top horizontal course 420, a rear vertical course 422, and a bottom horizontal course 424.

The chief difference between the two embodiments is that the drop box 100 of FIG. 1, when in a condition to receive mail pieces, has the door 116 occupying only the horizontal course 118 (FIG. 1), whereas the drop box 400 of FIG. 4, when in a condition to receive mail pieces, has its door 416 occupying all three of the lower horizontal course 424 (corresponding to the horizontal course 118 in FIG. 1), the rear vertical course 422 and the top horizontal course 420. Thus the door 416 may be approximately three times as long as the door 116 of the embodiment of FIG. 1.

In some embodiments, the drop box 400 may include features described in conjunction with FIG. 2. For example, the drop box 400 may include an interior back wall/floor assembly (like assembly 140 of FIG. 2, not shown in FIG. 4) and/or other structure or structures to limit the size of mail pieces to be deposited into the drop box 400. In addition or alternatively, the drop box 400 may include a guide ramp (not shown in FIG. 4) like the ramp 134 shown in FIG. 2; in addition or alternatively, the drop box 400 may have a pad (not shown in FIG. 4) like the pad 136 shown in FIG. 2. As was the case with respect to the drop box 100, additional or different structure, such as other ramps and/or guides, may be present in the drop box 400, though not shown, to aid in guiding mail pieces to a desired location or locations in the lower portion 428 of the drop box 400.

In some embodiments, the drop box 400 may include a bias mechanism 430 (shown in phantom in FIG. 4) to bias the door 416 toward the position of the door that is shown in FIG. 4. At least in terms of its principles of operation, the bias mechanism 430 may be similar to the bias mechanism 142 shown in FIG. 3. In addition or alternatively, the drop box 400 may include a motor 432 (shown in phantom) that may be controlled by a pushbutton 434 (shown in phantom). The motor 432 may be coupled to the door 416 to move the door in at least one direction between the door position shown in FIG. 4 and another position that will be described below. It will be appreciated that, in this and other embodiments, if a motor and pushbutton are provided, the handle 426 (FIG. 4) or 130 (FIG. 1) may be dispensed with. In other respects not specifically referred to herein, the drop box 400 may resemble the drop box 100.

In operation of the drop box 400, a user (not shown) approaches the front wall 406 of the enclosure 402 and places the mail piece MP through the opening 404 of the enclosure 402 and onto the door 416. It is assumed that at this time the door 416 occupies the bottom horizontal course 424 and so is positioned to support the mail piece MP in the upper portion 436 of the enclosure 402. At the same time, other portions of the door 416 occupy the rear vertical course 422 and the top horizontal course 420, thereby preventing unauthorized access to the lower portion 428 of the drop box 400 where previously deposited mail pieces are stored.

To complete the depositing of the mail piece MP, the user may grasp and lower the handle 426, thereby causing the door to move so that it comes to occupy the front vertical course 418 while retreating, in the direction of the rear of the enclosure 402, from the bottom horizontal course 424. Thus the door 416 is withdrawn from under the mail piece MP, allowing the mail piece MPO to drop (and/or be guided by ramp(s), guide(s), etc.) into the lower portion 428 of the enclosure 402. Thereafter, by motor (if present), bias mechanism (if present) or manual raising of the handle 426, the door 416 may be returned to the position shown in FIG. 4.

Regardless of the position of the door 416 with respect to the bottom horizontal course 424 and the top horizontal course 420, access by unauthorized persons to the lower portion 428 of the drop box 400 is limited by the geometry and shape of the drop box 400 such that a potential thief would not be able to reach into the drop box 400 to remove any mail pieces stored therein. Thus, the drop box shown in FIG. 4, with an articulated door, provides a satisfactory amount of security for mail pieces deposited therein, but with a relatively simple and low-cost design.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A drop box for storing mail pieces, comprising:

an enclosure;

a first door-guiding track at a first interior side of the enclosure;

a second door-guiding track at a second interior side of the enclosure, said second interior side opposite said first interior side; and an articulated door positioned to run in said tracks along a path defined by said tracks, the door composed of a first elongate segment and a sequence of additional parallel elongate segments each hingedly joined to a respective preceding one of the segments, said path including a substantially horizontal course and a substantially vertical course, the door movable along said tracks between said horizontal course and said vertical course, said door defining at least a portion of a floor of an upper portion of said enclosure when in said horizontal course, said door closing an opening in said enclosure when in said vertical course, said door positioned, when in said horizontal course, to receive a mail piece inserted through said opening, said door operative to drop said mail piece from said upper portion of said enclosure to a lower portion of said enclosure upon the door being moved from said horizontal course to said vertical course.

2. The drop box according to claim 1, wherein said door is in a first position when in said horizontal course and in a second position when in said vertical course, said drop box further comprising means for biasing said door from said second position toward said first position.

3. The drop box according to claim 1, wherein said door is in a first position when in said horizontal course and in a second position when in said vertical course, said drop box further comprising a motor coupled to said door to move said door between said first and second positions.

4. A drop box for storing mail pieces, comprising:

an enclosure;

a first door-guiding track at a first interior side of the enclosure;

a second door-guiding track at a second interior side of the enclosure, said second interior side opposite said first interior side; and an articulated door positioned to run in said tracks along a path defined by said tracks, the door composed of a first elongate segment and a sequence of additional parallel elongate segments each hingedly joined to a respective preceding one of the segments, said path including a front vertical course, a top horizontal course, a rear vertical course spaced behind the front vertical course, and a bottom horizontal course spaced below said top horizontal course, the door movable along said tracks between a first position and a second position, said door occupying said bottom horizontal course, said rear vertical course and said top horizontal course when said door is in said first position, said door occupying said front vertical course, said top horizontal course and said rear vertical course when said door is in said second position, said door positioned to define at least a portion of a floor of an upper portion of said enclosure when said door is in said first position; said door positioned to receive, at said bottom horizontal course, a mail piece inserted into said upper portion of said enclosure via an opening in said enclosure when said door is in said first position; said door operative to drop said mail piece from said upper portion of said enclosure to a lower portion of said enclosure upon the door being moved from said first position to said second position; said door closing said opening in said enclosure when said door is in said second position.

5. The drop box according to claim 4, further comprising:

means for biasing said door from said second position toward said first position.

6. The drop box according to claim 4, further comprising:

a motor coupled to said door to move said door between said first and second positions.

* * * * *